(12) United States Patent
Nguyen

(10) Patent No.: US 7,808,693 B2
(45) Date of Patent: Oct. 5, 2010

(54) ELECTROCHROMIC DEVICES AND FABRICATION METHODS

(75) Inventor: Paul Nguyen, San Jose, CA (US)

(73) Assignee: Soladigm, Inc., Milpitas, CA (US)

( * ) Notice: Subject to any disclaimer, the term of this patent is extended or adjusted under 35 U.S.C. 154(b) by 63 days.

(21) Appl. No.: 11/956,238

(22) Filed: Dec. 13, 2007

(65) Prior Publication Data

US 2008/0304131 A1 Dec. 11, 2008

Related U.S. Application Data

(63) Continuation-in-part of application No. 11/778,619, filed on Jul. 16, 2007, now Pat. No. 7,609,433.

(60) Provisional application No. 60/933,869, filed on Jun. 7, 2007.

(51) Int. Cl.
*G02F 1/153* (2006.01)

(52) U.S. Cl. .................................. 359/270; 359/273

(58) Field of Classification Search .......... 359/265–274
See application file for complete search history.

(56) References Cited

U.S. PATENT DOCUMENTS

| 5,202,788 | A | 4/1993 | Weppner |
| 5,777,779 | A | 7/1998 | Hashimoto et al. |
| 6,420,071 | B1 * | 7/2002 | Lee et al. ............ 429/300 |
| 6,940,628 | B2 | 9/2005 | Giron |
| 7,593,154 | B2 * | 9/2009 | Burdis et al. ......... 359/265 |
| 2007/0097481 | A1 | 5/2007 | Burdis et al. |

OTHER PUBLICATIONS

PCT/US2008/066367, Notification Concerning Transmittal of International Preliminary Report on Patentability (Chapter I of the Patent Cooperation Treaty), Dec. 17, 2009, 8 pages.

* cited by examiner

*Primary Examiner*—William C Choi
(74) *Attorney, Agent, or Firm*—Joseph P. Curtin, L.L.C.

(57) ABSTRACT

An electrochromic device includes a first conductive layer, a single-layer or dual-layer ion conductor layer, and a second conductive layer. The layers are deposited using PVD, CVD, PECVD, atomic layer deposition, pulsed laser deposition, plating, or sol-gel techniques.

43 Claims, 2 Drawing Sheets

ELECTROCHROMIC DEVICES AND FABRICATION METHODS

CROSS-REFERENCE TO RELATED APPLICATIONS

This application is a continuation-in-part of U.S. patent application Ser. No. 11/778,619, filed Jul. 16, 2007, now U.S. Pat. No. 7,609,433 which claims the benefit of U.S. Provisional Patent Application Ser. No. 60/933,869 filed Jun. 7, 2007.

BACKGROUND OF THE INVENTION

1. Field of Invention

The present invention relates to electrochromic devices, and more particularly to electrochromic devices having dual-layer or single-layer ion conductors and methods for making such ion conductors.

2. Description of the Prior Art

Electrochromic materials are materials that change their optical properties as the result of an applied electrical potential. Such materials can be used to produce electrochromic devices that can vary the transmission or reflectance of electromagnetic radiation via application of an electrical potential. FIGS. 1 and 2 depict a typical prior art electrochromic device 100. Electrochromic device 100 includes an electrochromic (EC) layer 101, an ion conductor (IC) layer 102 and a counter-electrode (CE) layer 103, which may also be electrochromic. Layers 101-103 are positioned between two transparent conducting oxide (TCO) layers 104 and 105.

Typically, EC layer 101 is a cathodic electrochromic material, such as $WO_3$, and CE layer 103 is an anodic electrochromic material, such as nickel oxide $NiO_x$. With ion incorporations, anodic electrochromic materials become bleached (high optical transmission state), whereas cathodic electrochromic materials become colored (low optical transmission state). The ions that move between EC layer 101 and CE layer 103 can be hydrogen ions (H+), lithium ions (Li+), or alkali and alkaline earth ions. When an electrical current is applied through TCO layers 104 and 105 across the EC/IC/CE layers (layers 101/102/103), ions are shuttled between EC layer 101 and CE layer 103 through IC layer 102, leading to switching between bleached and colored states. When in the bleached state, light and heat that is incident on an electrochromic device passes through the device. When in the colored state, only a portion of the light and heat incident on the electrochromic device passes through the device. FIG. 1 depicts an electric potential (e.g. battery 110) being applied between TCO layer 104 and TCO layer 105, and electrochromic device 100 in a bleached state. FIG. 2 depicts a reverse electric potential (e.g. battery 210) being applied between TCO layer 015 and TCO layer 104, and electrochromic device 100 in a colored state.

In FIGS. 1 and 2, IC layer 102 serves to electronically insulate EC layer 101 from CE layer 103, while allowing ions to go through. Pinholes in IC layer 102 result in electronic shorts, which can grow with time and usage, thereby resulting in poor reliability, device yield, and color memory. An inorganic solid state thin-film IC layer 102, such as $SiO_2$, $ZrO_2$ or $Ta_2O_5$, is often used in electrochromic switchable-window applications because of its durability with respect to UV and its sturdiness. An inorganic IC layer is often deposited via physical vapor deposition (PVD), such as sputtering or evaporation, or chemical vapor deposition (CVD) techniques, which can lead to many pinholes, especially in films less than 100 nm in thickness and in large-area window applications.

Dual-layer IC layers have been used to address layer delamination and electron flow problems in electrochromic devices. U.S. Pat. No. 5,777,779 teaches a dual-layer ion conductor layer, where the layers are the same material but are deposited with different process gases, intended to increase the bond between layers in an electrochromic device. The dual-layer IC layer is formed by processing a first portion of the IC in an atmosphere with water vapor and a second portion of the IC in an atmosphere containing oxygen. U.S. Patent Application Pub. No. 2007/0097481 describes an IC having at least three layers, including two ion transport layers separated by a buffer layer, which produces opposing diode effects. The three layer IC is used to block electron flow in both directions while permitting ionic conduction, allowing an electrochromic device to have greater dynamic range and stability.

DESCRIPTION OF THE PREFERRED EMBODIMENT

The present invention provides a technique for producing a bilayer ion conductor (IC) layer for an electrochromic device that significantly reduces or even eliminates pinholes in the IC layer, thereby increasing reliability, device yield, dynamic range, coloration uniformity during switching, and color memory of an electrochromic device. Uses of the dual-layer and single-layer ion conductor of the present invention include, but are not limited to, switchable smart windows for a buildings, vehicles, watercraft, aircraft or spacecraft; mirrors; display devices; telecommunication devices; eyewear devices, such as eyeglasses and sunglasses.

Figure 1:
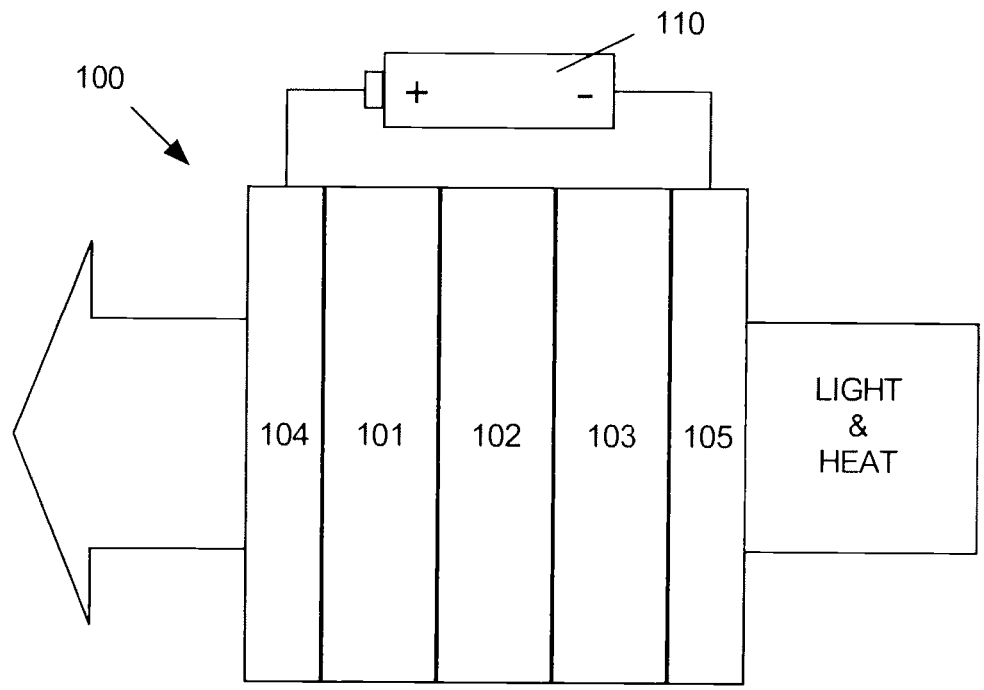
FIG. 1 shows a prior art electrochromic device in a bleached state.
Figure 2:
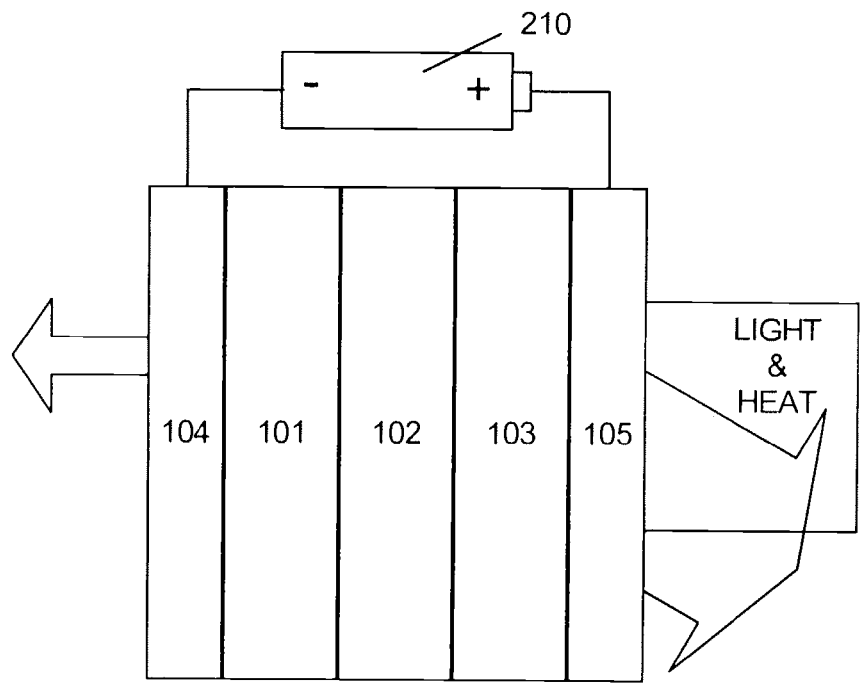
FIG. 2 shows a prior art electrochromic device in a colored state.
Figure 3:
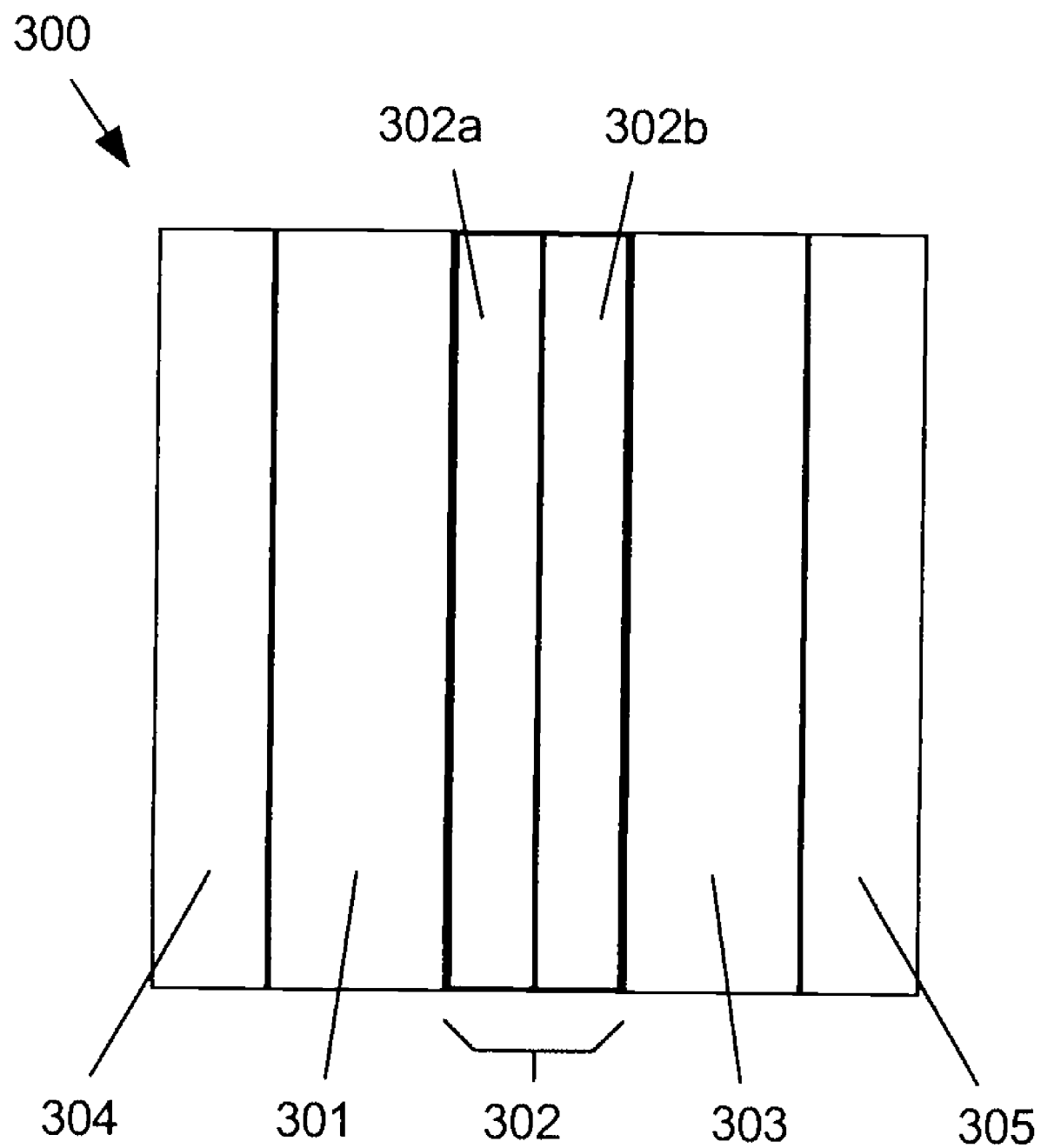
FIG. 3 depicts an electrochromic device having a bi-layer ion conductor (IC) layer.

FIG. 3 shows an electrochromic device 300 according to the present invention. Electrochromic device 300 includes an EC layer 301, an IC layer 302 and a CE layer 303, which may also be electrochromic. Layers 301-303 are positioned between two TCO layers 304 and 305. IC layer 302 is a dual-layer ion conductor (IC) layer 302 having first IC layer 302a and second IC layer 302b. IC layers 302a and 302b can be formed from the same ion-conducting material, using a two-step process, such as a physical vapor deposition (PVD) technique (e.g. DC, AC or RF sputtering, or evaporation), a chemical vapor deposition technique (such as CVD or plasma enhanced CVD (PECVD)), atomic layer deposition (ALD), pulsed laser deposition, a plating technique such as electroplating or electroless plating, a sol-gel technique, or a combination of these. The ion-conducting material can be a commonly used oxide such as $Ta_2O_5$, $SiO_2$, $Al_2O_3$, $Nb_2O_3$, $ZrO_2$, Li—Nb—O, Li—Ta—O, Li—Al—O, Li—P—O—N, Li—Ti—Al—P—O, Li—Si—Al—O, Li—Zn—Ge—O, Li—Si—P—O, Li—Zr—P—O, Li—La—Ti—O; a hygroscopic material to prevent water loss such as $B_2O_3$, $H_3BO_3$, $HBO_2$, $H_2B_4O_7$, $Bi_2O_3$, $Mg_3(PO_4)_2 \cdot 22H_2O$, $MgHPO_4 \cdot 3H_2O$, $KAlSO_4 \cdot 12H_2O$, $NaH_2P_2O_7 \cdot 6H_2O$; or a solid acid, preferably a weak solid acid, for effective proton conduction such as $CsHSO_4$, $CsH_2PO_4$, $KH_2PO_4$, $KHSO_4$, $K_3H(SO_4)_2$. In one embodiment, both the first and second IC layers 302a and 302b are deposited in an atmosphere containing water vapor and/or oxygen with a partial pressure in the range of about 0.01 mT to about 500 mT. First IC layer 302a can have a thickness of about 1-300 nm, and preferably 5-50 nm, and second IC layer 302b can have a thickness of about 1-300 nm, and preferably 5-50 nm. The deposition dynamics of and the material used for second IC layer 302b covers pin holes formed in first IC layer 302a associated with the deposition dynamics of the material used for first IC layer 302a. That is, the pin holes formed in first IC layer 302a are filled in by forming second IC layer 302b on first IC layer 302a. Thus, the two IC layers 302a and 302b can be formed using the same material but under different reaction/deposition conditions. In an alternative version of this embodiment, only a single IC layer is formed. In effect, the process above is used, but the second IC layer has zero thickness. With certain materials and for certain applications, the second IC layer is not required to achieve the needed performance.

In another embodiment, layers 302a and 302b are formed from different materials, such as $Ta_2O_5$ for layer 302a and $SiO_2$ for layer 302b, in a two-step process using the techniques described above. Of course, other combinations of different ion conductor materials could be used, such as $SiO_2$ for layer 302a and $Nb_2O_5$ for layer 302b. In one embodiment, both the first and second IC layers 302a and 302b are deposited in an atmosphere containing water vapor and/or oxygen with a partial pressure in the range of about 0.01 mT to about 500 mT, and preferably 1-100 mT. For this embodiment, layer 302a can have a thickness of about 1-300 nm, and preferably 5-50 nm, and layer 302b can have a thickness of about 1-300 nm, and preferably 1-50 nm. The different deposition dynamics of second IC layer 302b cover pinholes of first IC layer 302a better than when the first and second IC layers 302a and 302b are formed from the same material.

Additionally, by using two different materials, ion traps are created at the interface of the first and second IC layers 302a and 302b, in addition to the ion traps formed at the interfaces with their other interfaces. The ion traps formed at the interface of the first and second IC layers 302a and 302b increase the memory effect of the coloring state of the electrochromic layers by preventing the flow of positive ions. Further, the parameters associated with each IC layer can be selected for optimizing the performance of electrochromic device 300. For example, one of the IC layers can exhibit very low electronic conductivity, and yet can be thin enough to maintain a reasonably high ionic conductivity. As a result, less total charge is lost through electronic leakage, leading to faster switching, although the applied voltage will be relatively greater to overcome the ion trapping, particularly when high resistances of the transparent conductors are limiting factors for switching speed. As another result, a relatively low electronic leakage current provides a relatively high coloring state memory of the electrochromic layers. While the present invention can use hydrogen, lithium, alkali, or alkaline earth ions as the mobile ions, hydrogen and/or lithium ions are preferred because of their greater mobility.

The invention has been described above with reference to anion conductor having two layers or a single layer. This structure may be extended by additional layers in the ion conductor layer. For example, a tri-layer ion conductor layer can be formed by deposition of one or more materials under the same or different processing conditions (e.g. in the presence of water or oxygen). In addition, one of the ion conductor layers can be chosen from materials (such as silicon dioxide) that physically or chemically help reduce or prevent degradation, such as corrosion or reaction with adjacent ion conductor layers.

While certain representative embodiments and details have been shown for purposes of illustrating the invention, it will be apparent to those skilled in the art that various changes in the methods and apparatus disclosed herein may be made without departing from the scope of the invention which is defined in the appended claims.

What is claimed is:

1. A method for forming an electrochromic device, comprising:
    (a) forming a first conductive electrochromic layer;
    (b) forming a first solid ion conductor layer having a thickness between about 1 nm and 300 nm over the first conductive layer, wherein the first solid ion conductor layer is formed using a deposition technique selected from the group consisting of sputtering, evaporation, CVD, PECVD, ALD, pulsed laser deposition, plating, and sol-gel;
    (c) forming a second solid ion conductor layer having a thickness between about 1 nm and 300 nm on the first solid ion conductor layer, wherein the second solid ion conductor layer is formed from a different material than the first solid ion conductor layer, wherein the second solid ion conductor layer is formed using a deposition technique selected from the group consisting of sputtering, evaporation, CVD, PECVD, ALD, pulsed laser deposition, plating, and sol-gel, and no buffer layer is formed between the first solid ion conductor layer and the second solid ion conductor layer; and
    (d) forming a second conductive counter electrode layer over the second solid ion conductor layer.

2. The method of claim 1, wherein the first solid ion conductor layer includes a first material selected from the group consisting of $Ta_2O_5$, $SiO_2$, $Al_2O_3$, $Nb_2O_3$, $ZrO_2$, Li—Nb—O, Li—Ta—O, Li—Al—O, Li—P—O—N, Li—Ti—Al—P—O, Li—Si—Al—O, Li—Zn—Ge—O, Li—Si—P—O, Li—Zr—P—O, Li—La—Ti—O, $B_2O_3$, $H_3BO_3$, $HBO_2$, $H_2B_4O_7$, $Bi_2O_3$, $CsHSO_4$, $CsH_2PO_4$, $KH_2PO_4$, $KHSO_4$, and $K_3H(SO_4)_2$.

3. The method of claim 2, wherein the second solid ion conductor layer includes a second material selected from the group consisting of a commonly used oxide such as $Ta_2O_5$, $SiO_2$, $Al_2O_3$, $Nb_2O_3$, $ZrO_2$, Li—Nb—O, Li—Ta—O, Li—Al—O, Li—P—O—N, Li—Ti—Al—P—O, Li—Si—Al—O, Li—Zn—Ge—O, Li—Si—P—O, Li—Zr—P—O, Li—La—Ti—O, $B_2O_3$, $H_3BO_3$, $HBO_2$, $H_2B_4O_7$, $Bi_2O_3$, $CsHSO_4$, $CsH_2PO_4$, $KH_2PO_4$, $KHSO_4$, and $K_3H(SO_4)_2$, and the second material is different from the first material.

4. The method of claim 3, wherein the first solid ion conductor layer and the second solid ion conductor layer are each formed in selected atmospheres, wherein the selected atmospheres may be the same or different and are selected from the group consisting of water vapor, oxygen, and a mixture of water vapor and oxygen.

5. The method of claim 4, wherein the first conductive layer is a counter-electrode layer, and the second conductive layer is an electrochromic layer.

6. The method of claim 1, further comprising forming at least one additional ion conductor layer over the second solid ion conductor layer before forming the second conductive counter electrode layer, wherein each additional ion conductor layer is formed from a different material or using a different deposition technique than the previously formed ion conductor layer.

7. The method of claim 1, wherein the first solid ion conductor layer has a thickness between 5 nm and 50 nm.

8. The method of claim 1, wherein the second solid ion conductor layer has a thickness between 5 nm and 50 nm.

9. The method of claim 1, wherein one of the ion conductor layers is a material that reduces degradation of at least one adjacent layer.

10. The method of claim 1, further comprising providing ions for conduction through the ion conductor layers, wherein the provided ions include ions selected from the group consisting of hydrogen and lithium ions.

11. The method of claim 1, wherein the first ion conductor layer includes a first material selected from the group consisting of hygroscopic materials and solid acids.

12. An electrochromic device, comprising:
   (a) a first conductive electrochromic layer;
   (b) a first solid ion conductor layer having a thickness between about 1 nm and 300 nm formed on the first conductive layer;
   (c) a second solid ion conductor layer having a thickness between about 1 nm and 300 nm formed on the first solid ion conductor layer, wherein the second solid ion conductor is formed from a different material than the first solid ion conductor layer, no buffer layer being formed between the first solid ion conductor layer and the second solid ion conductor layer; and
   (d) a second conductive counter electrode layer formed over the second solid ion conductor layer.

13. The electrochromic device of claim 12, wherein the first solid ion conductor layer includes a first material selected from the group consisting of $Ta_2O_5$, $SiO_2$, $Al_2O_3$, $Nb_2O_3$, $ZrO_2$, Li—Nb—O, Li—Ta—O, Li—Al—O, Li—P—O—N, Li—Ti—Al—P—O, Li—Si—Al—O, Li—Zn—Ge—O, Li—Si—P—O, Li—Zr—P—O, Li—La—Ti—O, $B_2O_3$, $H_3BO_3$, $HBO_2$, $H_2B_4O_7$, $Bi_2O_3$, $CsHSO_4$, $CsH_2PO_4$, $KH_2PO_4$, $KHSO_4$, and $K_3H(SO_4)_2$.

14. The electrochromic device of claim 13, wherein the solid second ion conductor layer includes a second material selected from the group consisting of $Ta_2O_5$, $SiO_2$, $Al_2O_3$, $Nb_2O_3$, $ZrO_2$, Li—Nb—O, Li—Ta—O, Li—Al—O, Li—P—O—N, Li—Ti—Al—P—O, Li—Si—Al—O, Li—Zn—Ge—O, Li—Si—P—O, Li—Zr—P—O, Li—La—Ti—O, $B_2O_3$, $H_3BO_3$, $HBO_2$, $H_2B_4O_7$, $Bi_2O_3$, $CsHSO_4$, $CsH_2PO_4$, $KH_2PO_4$, $KHSO_4$, and $K_3H(SO_4)_2$.

15. The electrochromic device of claim 14, wherein the second solid ion conductor layer includes a plurality of sublayers of the second material, and adjacent sublayers of the second material are formed using different processing or deposition conditions.

16. The electrochromic device of claim 13, wherein the first solid ion conductor layer includes a plurality of sublayers of the first material, and adjacent sublayers of the first material are formed using different processing or deposition conditions.

17. The electrochromic device of claim 16, wherein the sublayers are formed using different atmospheres.

18. The electrochromic device of claim 17, wherein the different atmospheres are selected from the group consisting of water vapor, oxygen, and a mixture of water vapor and oxygen.

19. The electrochromic device of claim 16, wherein the second solid ion conductor layer includes a second material selected from the group consisting of $Ta_2O_5$, $SiO_2$, $Al_2O_3$, $Nb_2O_3$, $ZrO_2$, Li—Nb—O, Li—Ta—O, Li—Al—O, Li—P—O—N, Li—Ti—Al—P—O, Li—Si—Al—O, Li—Zn—Ge—O, Li—Si—P—O, Li—Zr—P—O, Li—La—Ti—O, $B_2O_3$, $H_3BO_3$, $HBO_2$, $H_2B_4O_7$, $Bi_2O_3$, $CsHSO_4$, $CsH_2PO_4$, $KH_2PO_4$, $KHSO_4$, and $K_3H(SO_4)_2$, the second material is different from the first material, the second conductor layer includes a plurality of sublayers of the second material, and adjacent sublayers of the second material are formed using different processing or deposition conditions.

20. The electrochromic device of claim 12, further comprising at least one additional ion conductor layer between the second solid ion conductor layer and the second conductive counter electrode layer, wherein each additional ion conductor layer is formed from a different material or using a different deposition technique than the previously formed ion conductor layer.

21. The electrochromic device of claim 12, wherein the first solid ion conductor layer has a thickness between 5 nm and 50 nm.

22. The electrochromic device of claim 12, wherein the second solid ion conductor layer has a thickness between 5 nm and 50 nm.

23. The electrochromic device of claim 12, wherein one of the ion conductor layers is a material that reduces degradation of at least one adjacent layer.

24. A method for forming an electrochromic device, comprising:
   (a) forming a first conductive electrochromic layer;
   (b) forming a first ion conductor layer having a thickness between about 1 nm and 300 nm over the first conductive layer, wherein the first ion conductor layer is formed using a deposition technique selected from the group consisting of sputtering, evaporation, CVD, PECVD, ALD, pulsed laser deposition, plating, and sol-gel, the first ion conductor layer including a first material selected from the group consisting of $Ta_2O_5$, $SiO_2$, $Al_2O_3$, $Nb_2O_3$, $ZrO_2$, Li—Nb—O, Li—Ta—O, Li—Al—O, Li—P—O—N, Li—Ti—Al—P—O, Li—Si—Al—O, Li—Zn—Ge—O, Li—Si—P—O, Li—Zr—P—O, Li—La—Ti—O, $B_2O_3$, $H_3BO_3$, $HBO_2$, $H_2B_4O_7$, $Bi_2O_3$, $Mg_3(PO_4)_2.22H_2O$, $MgHPO_4.3H_2O$, $KAlSO_4.12H_2O$, $NaH_2P_2O_7.6H_2O$, $CsHSO_4$, $CsH_2PO_4$, $KH_2PO_4$, $KHSO_4$, and $K_3H(SO_4)_2$;
   (c) forming a second ion conductor layer having a thickness between about 1 nm and 300 nm on the first ion conductor layer, wherein the second ion conductor layer is formed from a different material or using a different deposition technique than the first ion conductor layer, wherein the second ion conductor layer is formed using a deposition technique selected from the group consisting of sputtering, evaporation, CVD, PECVD, ALD, pulsed laser deposition, plating, and sol-gel, the second ion conductor layer including a second material selected from the group consisting of $Ta_2O_5$, $SiO_2$, $Al_2O_3$, $Nb_2O_3$, $ZrO_2$, Li—Nb—O, Li—Ta—O, Li—Al—O, Li—P—O—N, Li—Ti—Al—P—O, Li—Si—Al—O, Li—Zn—Ge—O, Li—Si—P—O, Li—Zr—P—O, Li—La—Ti—O, $B_2O_3$, $H_3BO_3$, $HBO_2$, $H_2B_4O_7$, $Bi_2O_3$, $Mg_3(PO_4)_2.22H_2O$, $MgHPO_4.3H_2O$, $KAlSO_4.12H_2O$, $NaH_2P_2O_7.6H_2O$, $CsHSO_4$, $CsH_2PO_4$, $KH_2PO_4$, $KHSO_4$, and $K_3H(SO_4)_2$, and the second material is different from the first material, and no buffer layer is formed between the first ion conductor layer and the second ion conductor layer; and
   (d) forming a second conductive counter electrode layer over the second ion conductor layer.

25. The method of claim 24, wherein the first ion conductor layer and the second ion conductor layer are each formed in selected atmospheres, and wherein the selected atmospheres may be the same or different and are selected from the group consisting of water vapor, oxygen, and a mixture of water vapor and oxygen.

26. The method of claim 25, wherein the first conductive layer is a counter-electrode layer, and the second conductive layer is an electrochromic layer.

27. The method of claim 24, further comprising forming at least one additional ion conductor layer over the second ion conductor layer before forming the second conductive counter electrode layer, each additional ion conductor layer being formed from a different material or using a different deposition technique than the previously formed ion conductor layer.

28. The method of claim 24, wherein the first ion conductor layer has a thickness between 5 nm and 50 nm.

29. The method of claim 24, wherein the second ion conductor layer has a thickness between 5 nm and 50 nm.

30. The method of claim 24, wherein one of the ion conductor layers is a material that reduces degradation of at least one adjacent layer.

31. The method of claim 24, further comprising providing ions for conduction through the ion conductor layers, wherein the provided ions include ions selected from the group consisting of hydrogen and lithium ions.

32. The method of claim 24, wherein the first ion conductor layer includes a first material selected from the group consisting of hygroscopic materials and solid acids.

33. A method for forming an electrochromic device, comprising:
(a) forming a first conductive electrochromic layer;
(b) forming a first ion conductor layer having a thickness between about 1 nm and 300 nm over the first conductive layer, wherein the first ion conductor layer is formed using a deposition technique selected from the group consisting of sputtering, evaporation, CVD, PECVD, ALD, pulsed laser deposition, plating, and sol-gel;
(c) forming a second ion conductor layer having a thickness between about 1 nm and 300 nm on the first ion conductor layer, wherein the second ion conductor layer is formed from a different material or using a different deposition technique than the first ion conductor layer, wherein the second ion conductor layer is formed using a deposition technique selected from the group consisting of sputtering, evaporation, CVD, PECVD, ALD, pulsed laser deposition, plating, and sol-gel, the second ion conductor layer comprising a thickness between 5 nm and 50 nm, no buffer layer is formed between the first ion conductor layer and the second ion conductor layer; and
(d) forming a second conductive counter electrode layer over the second ion conductor layer.

34. An electrochromic device, comprising:
(a) a first conductive electrochromic layer;
(b) a first ion conductor layer having a thickness between about 1 nm and 300 nm formed over the first conductive layer, the first ion conductor layer including a first material selected from the group consisting of $Ta_2O_5$, $SiO_2$, $Al_2O_3$, $Nb_2O_3$, $ZrO_2$, Li—Nb—O, Li—Ta—O, Li—Al—O, Li—P—O—N, Li—Ti—Al—P—O, Li—Si—Al—O, Li—Zn—Ge—O, Li—Si—P—O, Li—Zr—P—O, Li—La—Ti—O, $B_2O_3$, $H_3BO_3$, $HBO_2$, $H_2B_4O_7$, $Bi_2O_3$, $Mg_3(PO_4)_2 \cdot 22H_2O$, $MgHPO_4 \cdot 3H_2O$, $KAlSO_4 \cdot 12H_2O$, $NaH_2P_2O_7 \cdot 6H_2O$, $CsHSO_4$, $CsH_2PO_4$, $KH_2PO_4$, $KHSO_4$, and $K_3H(SO_4)_2$;
(c) a second ion conductor layer having a thickness between about 1 nm and 300 nm formed on the first ion conductor layer, wherein the second ion conductor is formed from a different material or using a different deposition technique than the first ion conductor layer, the second ion conductor layer including a second material selected from the group consisting of $Ta_2O_5$, $SiO_2$, $Al_2O_3$, $Nb_2O_3$, $ZrO_2$, Li—Nb—O, Li—Ta—O, Li—Al—O, Li—P—O—N, Li—Ti—Al—P—O, Li—Si—Al—O, Li—Zn—Ge—O, Li—Si—P—O, Li—Zr—P—O, Li—La—Ti—O, $B_2O_3$, $H_3BO_3$, $HBO_2$, $H_2B_4O_7$, $Bi_2O_3$, $Mg_3(PO_4)_2 \cdot 22H_2O$, $MgHPO_4 \cdot 3H_2O$, $KAlSO_4 \cdot 12H_2O$, $NaH_2P_2O_7 \cdot 6H_2O$, CsHSO4, $CsH_2PO_4$, $KH_2PO_4$, $KHSO_4$, and $K_3H(SO_4)_2$, and no buffer layer is formed between the first ion conductor layer and the second ion conductor layer; and
(d) a second conductive counter electrode layer formed over the second ion conductor layer.

35. The electrochromic device of claim 34, wherein the first ion conductor layer includes a plurality of sublayers of the first material, and adjacent sublayers of the first material are formed using different processing or deposition conditions.

36. The electrochromic device of claim 35, wherein the sublayers are formed using different atmospheres.

37. The electrochromic device of claim 36, wherein the different atmospheres are selected from the group consisting of water vapor, oxygen, and a mixture of water vapor and oxygen.

38. The electrochromic device of claim 34, wherein the second ion conductor layer includes a plurality of sublayers of the second material, and adjacent sublayers of the second material are formed using different processing or deposition conditions.

39. The electrochromic device of claim 34, further comprising at least one additional ion conductor layer between the second ion conductor layer and the second conductive counter electrode layer, wherein each additional ion conductor layer is formed from a different material or using a different deposition technique than the previously formed ion conductor layer.

40. The electrochromic device of claim 34, wherein the first ion conductor layer has a thickness between 5 nm and 50 nm.

41. The electrochromic device of claim 34, wherein the second ion conductor layer has a thickness between 5 nm and 50 nm.

42. The electrochromic device of claim 34, wherein one of the ion conductor layers is a material that reduces degradation of at least one adjacent layer.

43. An electrochromic device, comprising:
(a) a first conductive electrochromic layer;
(b) a first ion conductor layer having a thickness between about 1 nm and 300 nm formed over the first conductive layer;
(c) a second ion conductor layer having a thickness between about 1 nm and 300 nm formed on the first ion conductor layer, wherein the second ion conductor is formed from a different material or using a different deposition technique than the first ion conductor layer, and the second ion conductor layer having a thickness between 5 nm and 50 nm, and no buffer layer is formed between the first ion conductor layer and the second ion conductor layer; and
(d) a second conductive counter electrode layer formed over the second ion conductor layer.

* * * * *